United States Patent

[11] 3,588,666

| [72] | Inventors | Gianni Bertolini;<br>Mario Vinsani, Milan, Italy |
|---|---|---|
| [21] | Appl. No. | 876,207 |
| [22] | Filed | Dec. 1, 1969 |
| [45] | Patented | June 28, 1971 |
| [73] | Assignee | Olivetti-General Electric S.p.A.<br>Caluso (Torino), Italy |
| [32] | Priority | May 20, 1966 |
| [33] | | Italy |
| [31] | | 11601/66 |
| | | Continuation of application Ser. No.<br>639,495, May 18, 1967, now abandoned. |

[54] POWER CONVERTER WITH REGULATED OUTPUT
5 Claims, 8 Drawing Figs.

[52] U.S. Cl. ............................................. 321/2,
307/33, 321/18, 323/22, 323/38
[51] Int. Cl. ............................................. H02m 3/32
[50] Field of Search ............................................. 321/2, 16,
18; 323/18, 22 (T), 38

[56] References Cited
UNITED STATES PATENTS

| 3,219,906 | 11/1965 | Keller et al. | 321/16 |
| 3,323,037 | 5/1967 | Doss | 323/22(SCR) |
| 3,341,765 | 9/1967 | Rogers, Jr. et al. | 321/18X |
| 3,365,654 | 1/1968 | Johnston | 321/16X |
| 3,432,737 | 3/1969 | Hunter et al. | 321/2 |

*Primary Examiner*—J. D. Miller
*Assistant Examiner*—A. D. Pellinen
*Attorneys*—George V Ellgroth and Joseph B. Forman ABSTRACT: Apparatus for regulating direct current power from an unregulated direct current power source comprising a constant frequency pilot oscillator and at least one stabilizing unit. Each stabilizing unit includes switching means for interrupting the current from the direct current power source during a portion of each cycle which is controlled by the pilot oscillator, and including a rectifying circuit and a filtering circuit for refining the regulated output from the switching means. The output of the filtering circuit is monitored by a comparison device, which generates a signal, representative of the variations of the output voltage from a predetermined level and, which signal is coupled to an error signal generator to produce an error signal. The error signal, which is representative of the output of the comparison device, and thus the output from the filtering circuit is then fed from the error signal generator to an enabling device. The enabling device generates a signal to control the conduction and nonconduction intervals of the switching device, as a function of the variation of the output voltage from a predetermined value.

POWER CONVERTER WITH REGULATED OUTPUT

This is a continuation of Ser. No. 639,495 filed May 18, 1967, now abandoned.

The invention relates to a stabilized and regulated DC power supply, and more precisely to a power supply of the switching type, wherein the stabilization of the output voltage is obtained by changing the ratio between open and closed time intervals of a switching device.

Stabilized DC power supplies are known wherein a switching device, usually comprising at least a semiconductor element, opens and closes the feeding circuit in consecutive time intervals, whose mutual ratio determines the quantity of energy which is transferred, in the time unit, from a nonstabilized DC energy source to the output terminal in form of direct current at constant voltage.

Said ratio between closed-switch and open-switch time intervals is determined as a function of the output of a proper comparison device, comparing a variable quantity, function of the output voltage, to a constant quantity, acting as reference value. Said comparison device controls the emission of a signal having at least one characteristic parameter variable as a function of the difference between said reference value and the quantity which is a function of the output voltage.

Said signal, called error signal, in its turn, controls the ratio between open-switch and closed-switch time intervals, is such a way, that the output voltage is changed in the sense that will annihilate the difference between effective value and correct value of the output voltage. The output voltage must be accurately filtered and smoothed to reduce at a minimum the residual ripple that is a consequence of the interruption of the current caused by the switching device.

In the recent embodiments of switching-type power supplies, the switching device generally comprises at least a silicon controlled rectifier (SCR), that is, a semiconductor device having three electrodes: an anode, a cathode and a control electrode.

In said devices, if a sufficient positive voltage is applied between anode and cathode, a current flows through the SCR only if a positive voltage pulse is at same instant applied to the control electrode.

When said SCR is in said conducting state, it is no more sensitive to any further change in the voltage applied to the control electrode.

To put it again in the initial, nonconducting state, the flow of current through the device must be interrupted. This is generally achieved applying to the device a reverse voltage of appropriate value.

In the prior art stabilized power supplies, which employ a SCR as switching device, a special circuit controlled by the error signal determines the instant of the application of the control signal to the control electrode, so as to make the SCR conductive, whereas a special circuit, like the one known as Morgan circuit, causes the SCR to revert to nonconductivity after a time interval determined by the circuit's characteristics. Therefore the stabilization is achieved by reducing or increasing, according to the error signal, the frequency of the conducting time intervals, which are constant in length.

Said devices have the disadvantage that the controlled rectifier has to interrupt the whole current provided by the nonregulated power supply, and consequently it is rather expensive; moreover the time requested for the SCR to switch from the nonconducting state to the conducting state, is, for such high-power SCR, high and subject to variations. In addition, the switching frequency is varying during the operation.

Another type of known power supply is the so-called "phase modulated" power supply, wherein the interruption of the current in the SCR is obtained by the voltage inversion due to the AC voltage supply which is generally the AC mains supply.

The disadvantage of such devices is, that they operate at the low frequency of the AC mains supply network, the filtering and smoothing of the regulated output being therefore difficult and expensive.

The regulated power supply according to the invention obviates to such inconveniences by operating at a switching frequency controlled by a pilot multivibrator, wherein the duration of the closed-switch time intervals is controlled by a logical circuit as function of at least one characteristic parameter of the error signal. Said closed switch time interval is in a determined time relation with the voltage wave generated by the pilot multivibrator.

According to the invention, the feeding current is interrupted by power transistors controlled by at least a SCR, which is therefore designed for interruption of a small part of the load: the duration of the conducting interval is controlled by said logical circuit and the operating frequency is constant and may be chosen at the most convenient value for the intended purposes.

In case of a power supply intended to deliver stabilized voltages of different values, the different stabilizing units which deliver stabilized currents at said different voltages, may conveniently be controlled by the same pilot multivibrator at the same frequency.

These and other features of the invention will appear from the following description of two preferred embodiments thereof, with reference to the accompanying drawings, in which:

FIG. 1 represents the block diagram of a power supply system, comprising a nonregulated power supply 1, a pilot multivibrator 2, and several stabilizing units indicated by 3a, 3b, 3c, etc.

Figure 1:
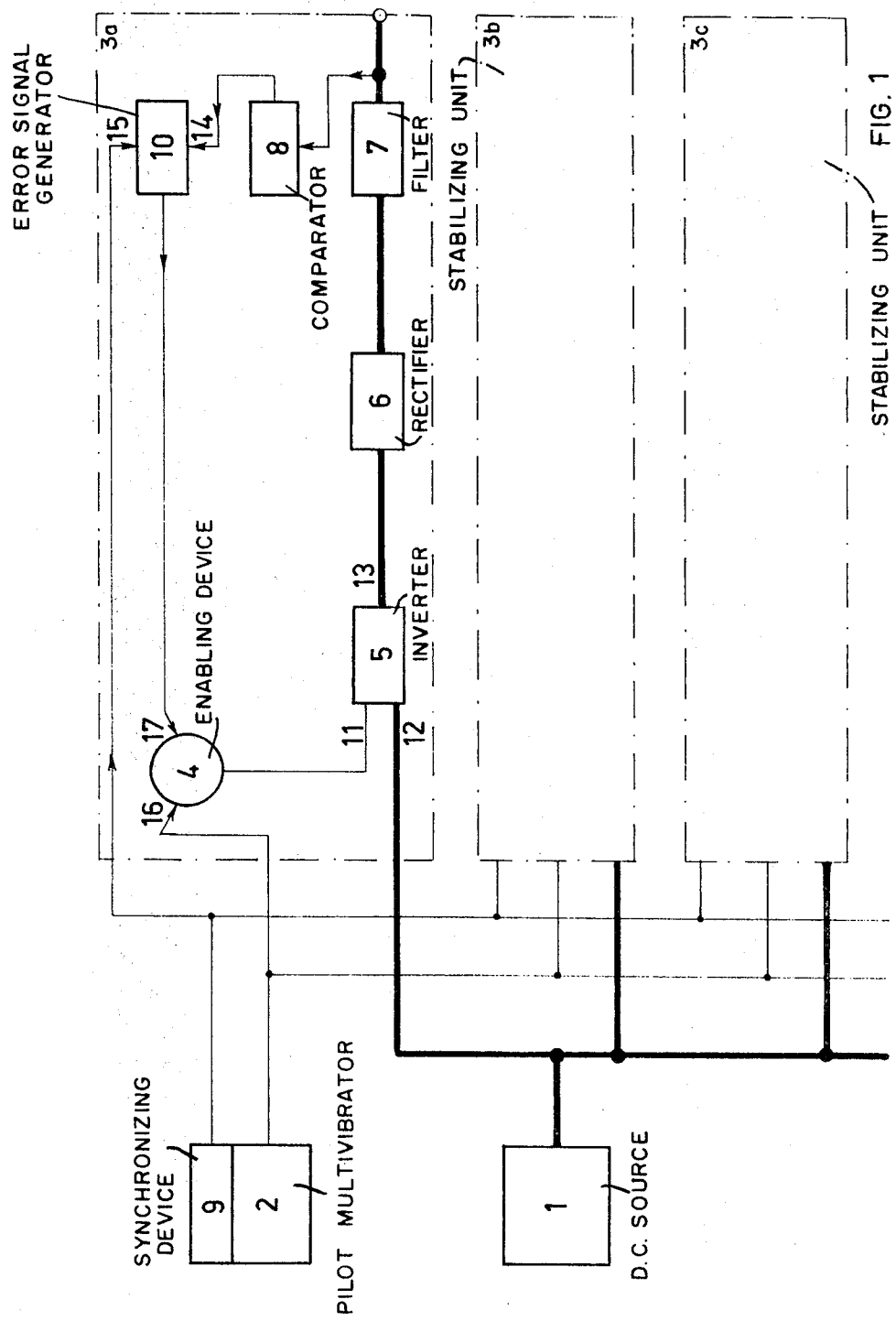
FIG. 1 shows a block diagram of a power supply system, according to a first preferred embodiment of the invention.

The nonregulated power supply 1 is a DC source of whatever type, able to deliver the required power at a nominal voltage, for instance 24 v., subject to variation within stated limits, for instance ±20 percent.

The pilot multivibrator may generate an alternating voltage of determined frequency, for instance 1000 pps. The half wave form of said alternating voltage is substantially trapezoidal, and comprises a steep rising front, a time interval, very near to an half-period, of constant maximum value, and a steep falling front.

Due to the steepness of said fronts, said waveforms will be considered as rectangular, unless the rise and fall time of said fronts is to be taken into consideration, and will be indicated as square waves.

The pilot multivibrator 2 is, for instance, fed by the nonregulated power supply, and comprises a synchronizing device 9 delivering a synchronizing signal whose characteristics will be indicated thereafter.

Within the stabilizing unit indicated by 3a, several blocks are indicated corresponding to the different devices comprised in said unit. Corresponding devices are comprised in the other units indicated by 3b, 3c...

The connections between different devices comprised in a single unit are indicated with an heavy line, when said connections are transferring the main part of the power to be stabilized, while a thin line indicates those connections which transfer only a substantially small portion of the power, for controlling the different devices.

A stabilizing unit comprises:
an enabling device 4
a controlled inverter 5
a rectifying device 6
a filtering device 7
a comparison device 8
an error signal generator 10

The square wave signal, generated by multivibrator 2 is applied to the input 16 of the enabling device 4.

The error signal is applied to the remaining input 17 of said device, said error signal comprising a sequence of impulsive signals, or wave fronts, generated by device 10. Said sequence is synchronized, as it will be described thereafter, to the square wave alternating signal generated by multivibrator 2, in such a way, that a particular impulsive signal, or wave front, comprised in said error signal, is separated from the instant at which said square wave signal passes through zero by a time interval depending only from the difference between the quantity to be stabilized and a reference quantity.

As a result of the coexistence, in the enabling device, both of said error signal and of the square wave alternating signal, the output signal from said enabling unit is a square wave alternating signal, said square wave having a variable length.

The rising front of each half wave is coincident in time with said particular pulse or wave front of the error signal, and therefore is more or less delayed in respect to the falling front of the preceding half wave, which is synchronized with the falling front of the square wave signal generated by the multivibrator 2.

Said variable length square wave alternating signal is applied to input 11 of the controlled inverter 5, which inverts and modulates the direct current delivered by the nonregulated power supply 1, applied to input 12 of the said controlled inverter 5.

At output 13 of said device 5 the voltage has the form of a variable length square wave alternating voltage, carrying the full power to be regulated by the stabilizing unit 3a.

The inverter 5 comprises a transformator, and therefore the maximum value of said alternative voltage may be in whatever fixed ratio to the nominal voltage of the nonregulated power supply.

Said variable length square wave alternating voltage is applied to the rectifier device 6 which delivers at its output a sequence of square unidirectional half waves, of variable length, separated by intervals of absence of voltage of complementary length, in such a way, that the period, and therefore the fundamental frequency, of said voltage waves is constant.

By varying the ratio between intervals of presence and absence of voltage, the average voltage value varies with continuity from the zero value and the maximum value, coinciding with the square wave maximum value.

Said variable length unidirectional square waves are applied to the filtering device, which delivers at its output a filtered smoothed DC voltage, whose value is coincident with the average value of the unidirectional half wave voltage.

Said voltage is the stabilized voltage of the direct current delivered by the stabilizing unit.

Said voltage value is applied to the input of the comparison device, wherein a voltage, function of the output voltage, and called comparison voltage, is compared to a constant reference voltage, as, for instance, the voltage across a Zener diode. The difference between said comparison voltage and said reference voltage is applied to the input 14 of the error signal generating device, while a synchronizing signal generated by the synchronizing device 9 is applied to the second input 15 of said error generating device 10.

Said synchronizing signal is composed, for instance, of a sequence of pulse signals equally spaced in time which are in a fixed temporal relation with definite significant instants of the square wave alternating signal generated by said multivibrator, said definite significant instant being for instance the instants wherein said square waves pass through zero value.

The error signal generator 10 produces a sequence of pulses or wave fronts, such that said pulses or wave fronts are delayed, in reference to the synchronizing signals, by a time interval which is function of the difference between comparison voltage and reference voltage.

Said error signal is applied to the input 17 of the enabling device 4. By effect of said error signal, the length of the square waves of the rectified current at the output of the rectifying device 7, and in consequence, the average voltage of said square waves, depends on the difference between comparison voltage and reference voltage, in such a way that, if the output voltage takes a value only a little higher than the correct output value, the difference between comparison voltage and reference voltage affects the error signal generating device, increasing the delay between the pulses or wave fronts and the synchronizing signals and correspondingly reducing the length of said square waves. Consequently the said average value, and the output voltage value are reduced to the correct output value.

A stabilizing system corresponding to the block diagram illustrated above is now being described in detail.

Figure 2:
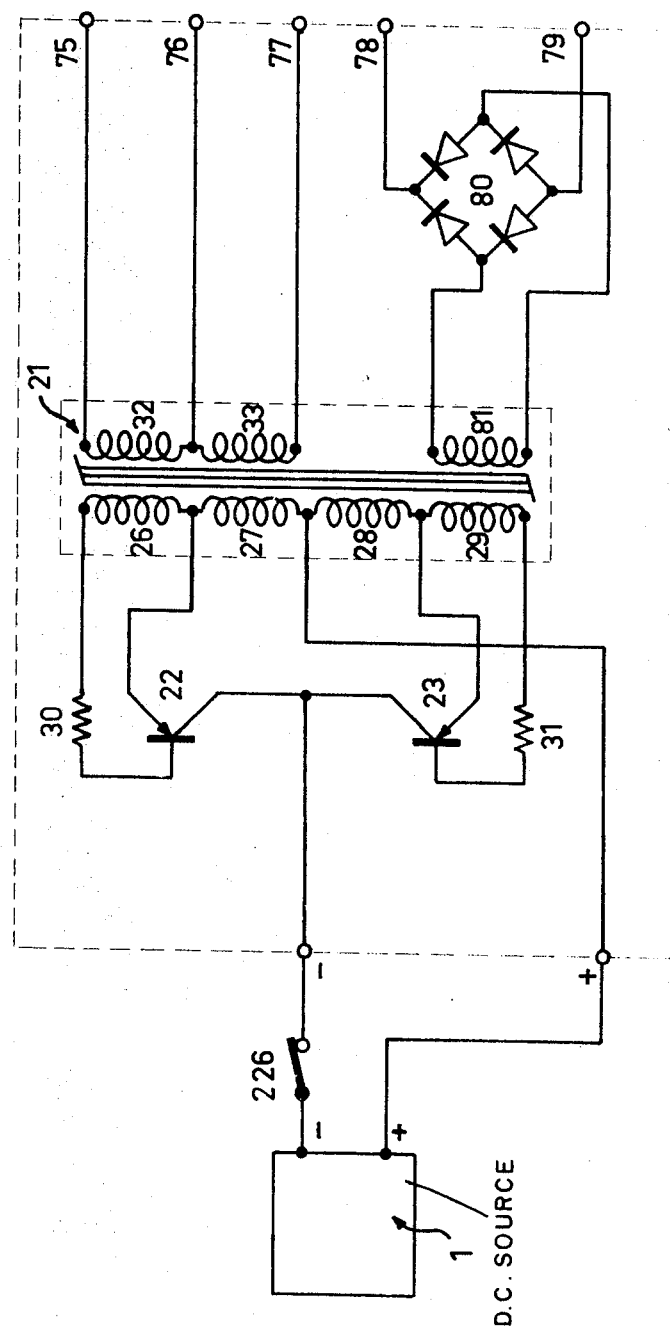
FIG. 2 shows the wiring diagram of the pilot multivibrator and of the synchronizing device according to said first preferred embodiment.

FIG. 2 represents the wiring diagram of the pilot multivibrator.

It is indicated, as a whole, by 2, and, it is substantially a saturating transformer multivibrator which comprises essentially a multiple winding saturable core transformer, and two transistors 22 and 23.

The PNP type transistors 22 and 23 are connected by their collectors to the negative power supply terminal, which in turn is connected to the negative output terminal, of the nonregulated power supply unit 1 through switch 126, the positive output of said nonregulated power supply being connected to the center tap of the primary winding of transformer 21.

Said primary winding comprises four sections: 26, 27, 28 and 29. The center point, common to sections 27 and 28 is connected to the positive power supply. The point common to sections 26 and 27 is connected to emitter of transistor 22 and the terminal point of section 26 is connected through resistor 30 to the base of transistor 22.

Likewise the point common to sections 28 and 29 is connected to the emitter of the transistor 23 and the terminal point of section 29 is connected through resistor 31 to the base of transistor 23.

The transformer 21 has two secondary windings, one of which comprises two sections 32 and 33 with a common point, the second comprising a single section feeding the bridge rectifier 80.

By closing switch 26 a voltage difference appears between emitter and collector of both transistors 22 and 23, the emitters being positive. As the bases are at the same voltage as the emitters, only a very small current flows through said transistors.

By effect of the small differences existing between the characteristics of both transistors, said small initial currents will differ by a very small quantity; and as said currents pass in opposite sense through sections 27 and 28 of the transformer, an initially very small flux due to said difference of currents will establish itself in the transformer core.

The winding sense of sections 27 and 28 is such that said small flux cause a voltage across windings 26 and 29, such as to apply a negative voltage to the base of the most conductive transistor, for instance transistor 22. Therefore the conductivity of said transformer is enhanced, whereas said flux applies a positive voltage to the base of transistor 23, rendering the same less conductive, and finally cutting it off. The current delivered by the power supply passes through transistor 22 and increases in a substantially linear way.

In consequence, as long as the flux in the core is proportional to the current in the winding, also the flux will increase linearly, and a constant voltage will be induced across all windings of the transformer.

As the saturating condition is reached, the flux cannot increase any more, and therefore the voltage applied to the bases of the transistors goes to zero.

The transistor 22, which was conducting is cut off and consequently the interruption in the current flowing through it causes a decrease of flux in the core of the transformer. The core is no more saturated, and the flux varies linearly toward the opposite saturation value, originating a constant voltage of reverse polarity across all windings of the transformer.

Figure 4:
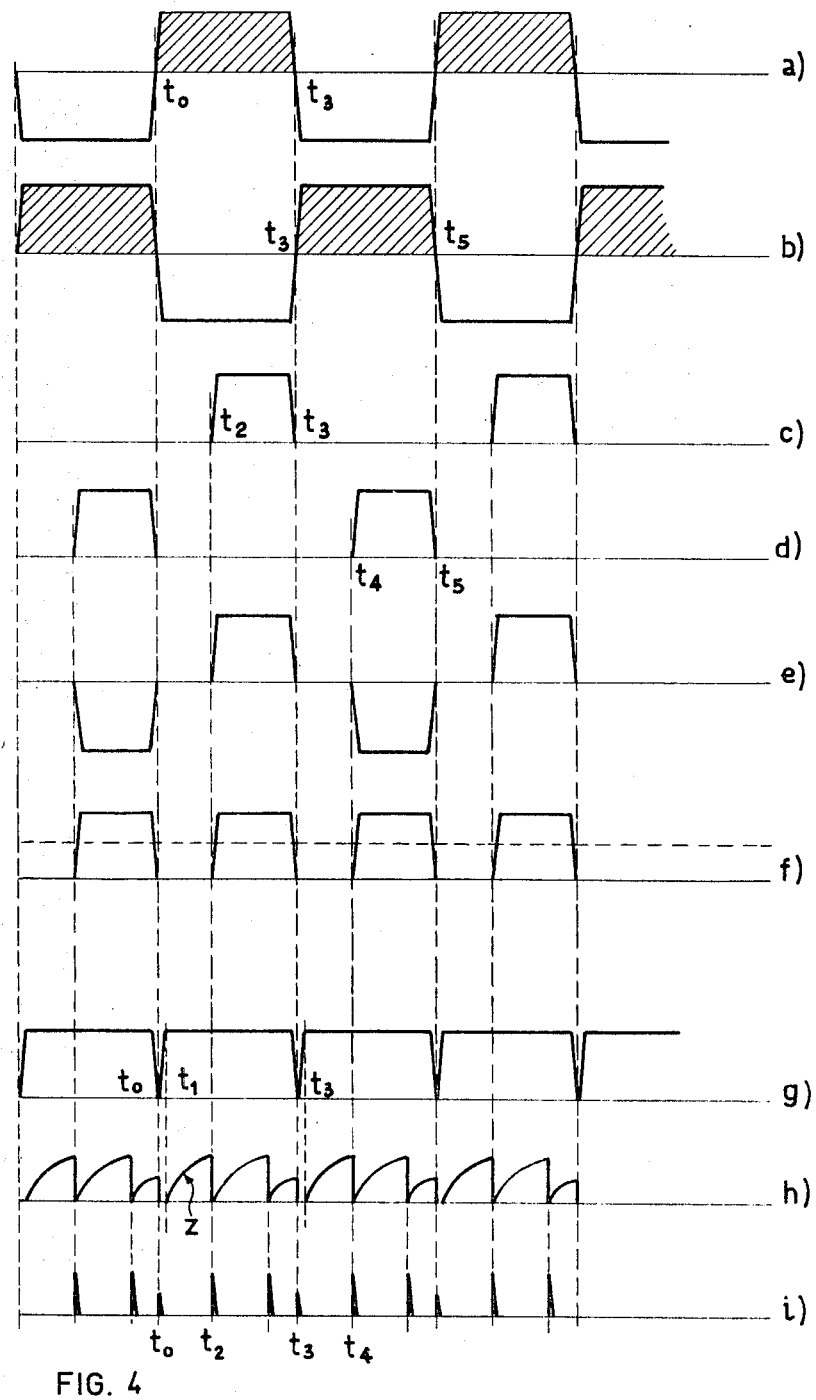
FIG. 4 shows the voltage and current waveforms in different points of the stabilizing unit according to said first embodiment.

When the opposite saturation value is reached, the process is reversed and repeated. A sequence of alternative square wave oscillations is therefore obtained. In the secondary windings of sections 32 and 33, having a common point and connected to terminals 75, 76, 77, two alternative square wave voltages, in phase opposition, as indicated by diagrams a and b of FIG. 4 are obtained at terminals 75 and 77 referred to terminal 76. Said alternative square wave voltage is distributed, through lead wires connected to said terminals 75, 76, 77, to all stabilizing units controlled by the pilot multivibrator.

Secondary winding 81 feeds a rectifying bridge 80, which delivers a full-wave rectified nonfiltered voltage, that is a voltage formed by a succession of unidirectional square waves separated by very small time intervals wherein the voltage value falls to zero in instants which coincide with the instants wherein the square wave alternating voltage generated by multivibrator 3 passes through zero, as indicated in diagram g of FIG. 4.

Figure 3:
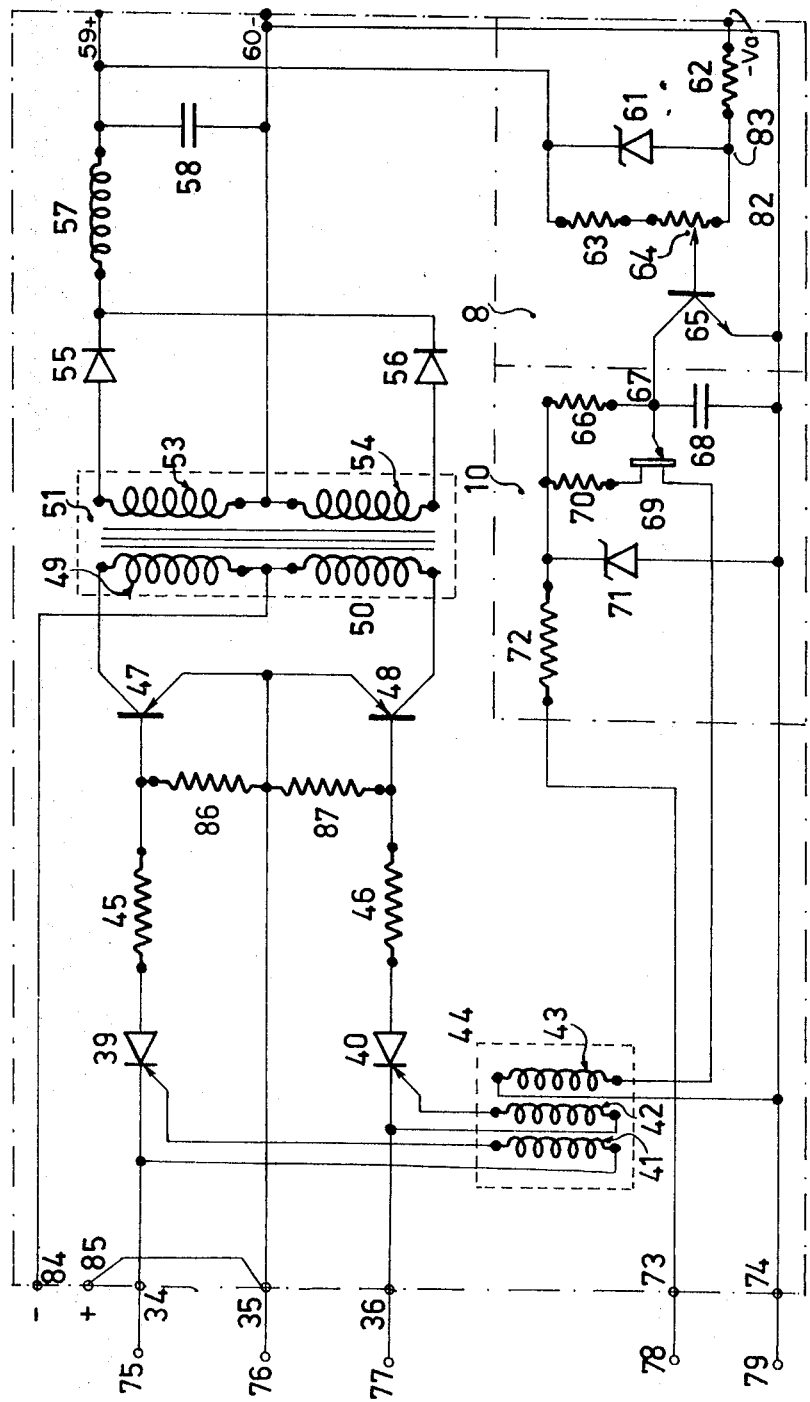
FIG. 3 shows the wiring diagram of a stabilizing unit according to said first embodiment.

FIG. 3 represents the wiring diagram of a stabilizing unit. It comprises, among other components, a pair of silicon controlled rectifiers 39 and 40, a pair of windings 41 and 42, controlling the same, and being part of a control transformer 44, a pair of power transistors 47 and 48, a power transformer 51 having a primary winding comprising two sections 49 and 50.

The primary winding 43 of transformer 44 is connected to the output of the error signal generator 10. The anodes of the silicon controlled rectifiers 39 and 40 are connected, through resistors 45 and 46, to the bases of the power transistors 47 and 48.

Said bases are connected to common center terminal 35 through resistors 86 and 87. The emitters of the power transistors 47 and 48 are connected to said common center terminal 35, and the collectors are connected to the terminals of sections 49 and 50 of the primary winding of transformer 51. The center point of said winding is connected through terminal 84 to the negative output of the nonregulated power supply, whereas the positive polarity of the same is connected, through terminal 85, to terminal 35.

The secondary winding of the power transformer 51 has a center point common to sections 53 and 54. The terminal points of said sections are connected to two power rectifier 55 and 56, forming a full wave rectifying unit. The unidirectional current delivered by said unit is filtered by a filtering unit comprising an inductor 57 and a capacitor 58 and is available at terminals 59 and 60 as the output current at stabilized voltage.

In addition to said components, which on the whole form the enabling device 4, the inverter controlled device 5, the rectifying device 6 and the filtering device 7 of FIG. 1, the stabilizing unit comprises the components forming the comparison device 8 and the error signal generator 10.

The comparison device comprises substantially a Zener diode 61 connected, by the cathode to terminal 59 carrying the positive stabilized DC power output and, by the anode, through a resistor 62, to a negative DC auxiliary source $-V_1$ having a convenient value, and which may be, for instance, the nonregulated power supply, or, if necessary, may be a small auxiliary redressing and filtering unit. The inverse voltage across the Zener diode, when submitted to a back biasing voltage is substantially constant, and therefore the voltage at point 83 is substantially fixed in respect to the voltage of the positive terminal 59 of the stabilized output.

Said voltage is applied to the terminals of a voltage divider formed by a resistor 63 and a potentiometer 64. The movable contact of said potentiometer is connected to the base of the NPN transistor 65 whose emitter is connected to wire 82, connected to the negative output terminal of the stabilized voltage. Said wire has the function of reference wire for all voltages of the comparison device and the error signal generator, and will be indicated as ground wire.

For a given position of the movable contact of said potentiometer 64 the base of said transistor 65 has a voltage, referred to the ground wire 82, differing by a constant quantity from the voltage of the positive output terminal 59. The emitter of transistor 65 is connected to said ground wire 82 and by means of the same to the negative output terminal 60.

Each variation of the difference of potential between said terminals 59 and 60 will cause a variation, percentually greater, of the difference of potential between base and emitter of transistor 65, and, in consequence, a variation of the resistence between collector and emitter of said transistor. If, for instance, the correct value of the difference of potential between terminal 59 and 60 is 4 v., and the voltage drop across resistor 63 and the included part of potentiometer 64 is 3—6 v., the difference of potential between base and emitter of transistor 65 results in 0—4 v. A 1 percent variation in the output voltage causes a variation of 0—04 v. in said difference of potential, corresponding to a percentage of 10 percent in the polarization voltage of the base in respect to emitter of transistor 65.

The collector of transistor 65 is connected to the error signal generator, indicated as a whole by 10. It comprises, among other components, an unijunction transistor 69, a capacitor 68 and a Zener diode 71.

Capacitor 68 is connected between ground wire 82 and point 67, which is common to the control electrode of the unijunction transistor 69 and to the collector of transistor 65.

Zener diode 71 is connected by the anode to ground wire 82 and, by the cathode, through resistor 72, to terminal 73, whereas the ground wire 82 is connected to terminal 74. Said terminals 73 and 74 are connected to corresponding terminals 78 and 79 fed by the bridge transformer 80 of the pilot multivibrator. Across said terminals, as said before, there exists a unidirectional voltage consisting in square waves separated by small intervals during which the voltage falls to zero (diagram g of FIG. 4).

Therefore the voltage across Zener diode 71 will be an unidirectional voltage of the same form, but of constant maximum value, such value being equal to the voltage drop across said Zener diode. Such voltage is applied, through resistor 70, to a base of unijunction transistor 69, whose other base is connected to a terminal of winding 43 of the control transformer 44, the other terminal being connected to ground wire 82. The same voltage, through resistor 66, feeds the collector of transistor 65.

The unijunction transistor has the characteristics of presenting an high impedance between bases when the voltage difference between negative base and control electrode is lower than a given threshold value. On the contrary, it allows the current to flow between both bases if said difference of voltage is higher than said threshold voltage. Said threshold voltage is approximately proportional to the voltage difference applied between bases of the unijunction transistor.

The operation of the regulating unit is as follows, with reference to FIG. 4, in which the different waveforms existing in different points of said unit are shown.

Diagram a indicates the alternating square wave voltage existing across terminals 34 and 35, and diagram b the same across terminals 36 and 35, which is inverted relatively to the former one. Said voltages are applied to the cathodes of silicon controlled rectifiers resp. 39 and 40, which inhibit unconditionally the flow of the current during the half-periods in which they are inversely biased. During the semiperiod of direct bias, as the ones shown hatched in diagram (a) and (b) of FIG. 4, said rectifiers allow the current to flow only during the time intervals comprised between the instant of application of a control signal to the respective control electrode, and the end of the direct bias semiperiod.

The control signal is applied to the control electrodes of controlled rectifiers 39 and 40 at an instant $t_2$ comprised between the initial instant $t_0$ and the final instant $t_3$ of the direct biasing period. The current flows through the rectifier 39 till the instant $t_3$, wherein the applied voltage is inverted and the rectifier 39 is inversely biased. The current wave through 39 has therefore the form of a substantially square wave, of a length shorter than a semiperiod, as represented in diagram c. In the following semiperiod the rectifier 40 is directly biased. If a control signal is applied to both control electrodes of the controlled rectifiers 39 and 40 at instant $t_4$, rectifier 40 is traversed by a square-wave current as represented in diagram d, which will cease at instant $t_5$, when the applied voltage is inverted.

The square wave current which flows through controlled rectifier 39 flows also through resistors 86 and 45, and causes the base of transistor 47 to become negative in respect to the emitter. In said condition transistor 47 is conductive, and a current delivered by the nonregulated power supply through terminals 84 and 85 flows through section 49 of the primary winding of transformer 51. The duration and the form of such wave will practically be the same as the one of the current wave which flows through the controlled rectifier 39.

In the following semiperiod, the current flowing through the circuit containing the resistors 87 and 46 and rectifier 40, causes the base of transistor 48 to be negative in respect to its emitter, and transistor 48 becomes conductive, whereas, as the current through resistors 86 and 45, and rectifier 39, ceases, transistor 47 is cut off. As transistor 48 is conducting, a current delivered by the nonregulated power supply through terminals 84 and 85 flows through section 50 of the primary winding of the transformer 51. Such wave will have practically the same duration and form of the current wave which flows through controlled rectifier 40.

Said current waves flowing alternatively through sections 49 and 50 of primary winding of transformer 51 cause an alternating flux in its core, and said flux gives rise to an alternative square wave voltage across secondary windings 53 and 54, as shown in diagram e of FIG. 4. The amplitude of said voltage depends upon the turn ratio of transformer 51 and may be fixed in the most convenient way in respect to the desired value of the voltage of the regulated output current, in a way completely independent from the voltage value of the nonregulated power output.

The rectifying device comprising the two rectifying diodes 55 and 56 allows to obtain, from the alternating voltage of diagram e, a rectified voltage having the characteristics indicated by diagram f, formed by unidirectional substantially square waves having a duration equal to the duration of the unidirectional waves of diagrams c and d. The dashed line of diagram f corresponds to the average value of said voltage, and coincides substantially with the output value of the filtered and smoothed voltage. Said output value is available at terminals 59 and 60, at the output of the filtering device comprising inductor 57 and capacitor 58.

Instants $t_2$ and $t_4$, wherein the control signals are applied to the control electrodes of the controlled diodes 39 and 40 are determined by the error signal generator 10 cooperating with the comparison device 8. Said control signals are positive voltage pulses originated in the secondary windings 41 and 42 of transformer 44 by current pulses flowing through primary winding 43 of said transformer. Said primary transformer 43 is series connected in the circuit of the bases of unijunction transistor 69. Said circuit is fed by a sequence of constant voltage square waves separated by short intervals wherein the voltage falls to zero, as represented in diagram g of FIG. 4.

Instants $t_0$ and $t_3$, wherein the voltage is zero, coincide with the instants of passage through zero of the alternate voltage square waves of diagrams a and b.

Taking into consideration what is happening between instants $t_0$ and $t_3$, it may be seen that at instant $t_1$, following $t_0$, the feeding voltage applied to unijunction transistor 70 has reached its maximum value. Said unijunction transistor, however, does not conduct, because its control electrode is at the ground wire voltage, the condenser 68 being discharged. The feeding voltage is applied also, through resistor 66 to an armature of condenser 68, the other armature being connected to ground wire 82. The condenser starts charging, and the voltage of point 67 starts rising according to an exponential law which depends from the time constant of the circuit comprising condenser 68, resistor 66 and NPN transistor 65. The resistance of said transistor depends from the voltage of the base in respect to ground wire 82. The rise curve of the voltage at point 67 is indicated in diagram h of FIG. 4, for instance by curve z.

If the base of said transistor 65 is negatively biased, the transistor is cut off and the time constant is determined by product RC of the resistance of resistor 66 and capacity of capacitor 68. If, on the contrary, said base is more or less positively biased, transistor 65 is more or less conductive, and a greater or lesser portion of the current flowing through resistor 66 is shunted to ground conductor 82 by transistor 65. As a consequence, the charging time of condenser 68 is more or less increased.

Therefore the time interval between instant $t_1$ of application of the full voltage across unijunction transistor 69 through resistance 70, and instant $t_2$, wherein the voltage of the control electrode of transistor unijunction reaches the threshold value, depends on the conductivity of transistor 65, and therefore on the bias of its base, and primarily from the value of the voltage difference between terminals 59 and 60.

When the control electrode of transistor unijunction transistor 69 conducts, the condenser 68 is discharged through the same, a current pulse flows through the primary voltage 43 of control transformer 44 causing voltage pulses across secondary windings 41 and 42.

Said voltage pulses acts as control pulses on control electrodes of the silicon controlled rectifiers 39 and 40. They cause the flowing of currents in the one of said controlled rectifiers, which is directly biased. As a consequence of the negative resistance characteristics of unijunction transistor, the same becomes the source of relaxation oscillations which cause other pulses to be applied to the control electrodes of controlled rectifier, as shown in diagrams h and i of FIG. 4. However, said following pulses have no effect whatever the controlled rectifiers 39 and 40.

When the feeding voltage applied to terminals 73 and 74 falls to zero, the condenser is discharged through the unijunction transistor, and the threshold value of said unijunction transistor falls to zero. Everything is brought back to the initial state, and the process recommences with the rising of the new feeding voltage wave.

Assuming now the output voltage at terminals 59 and 60 is increasing, this causes the increase of the bias voltage of the base of transistor 65 in respect to ground wire, and consequently a decrease of the resistance between emitter and collector of said transistor, which corresponds to a decrease of the resistance shunting the condenser 68 and a greater charging time of said condenser. Therefore the time needed by the voltage of the control electrode of transistor unijunction 69 to reach the threshold value is longer, and the control signal is more delayed in respect to the initial instant of the feeding square wave voltage as indicated in diagram g. It follows that the duration of the unidirectional square wave of diagram f is diminished, and correspondently the value of the rectified and smoothed voltage output is also subject to diminution, and therefore brought towards the correct value.

Varying the position of the movable contact of potentiometer 64, the bias of the base of transistor 65, for a given difference of potential between output terminals 59 and 60 is varied. As a consequence, the time needed by the voltage of the control electrode of the unijunction transistor to reach the threshold value is also varied. It is therefore possible, by varying the position of said movable contact, to vary at will, between given limits, the value of the output voltage which is maintained constant by the described stabilizing unit.

When a greater economy of material and smaller overall dimensions, especially for the filtering device, are needed as well as a greater regulating speed, it is convenient to operate at greater switching frequency, for instance in the range from 10 to 20 kilocycles per second. The silicon controlled rectifiers, however, are less conveniently employed at such frequencies for lack of sufficient switching speed. It may be therefore convenient to use different devices, and a different organization of the units composing the regulated power supply, the fundamental principles of the invention remaining unchanged. A second preferred embodiment of the invention more apt for an high switching frequency is hereafter described, with reference to the block diagram of FIG. 5.

Figure 5:
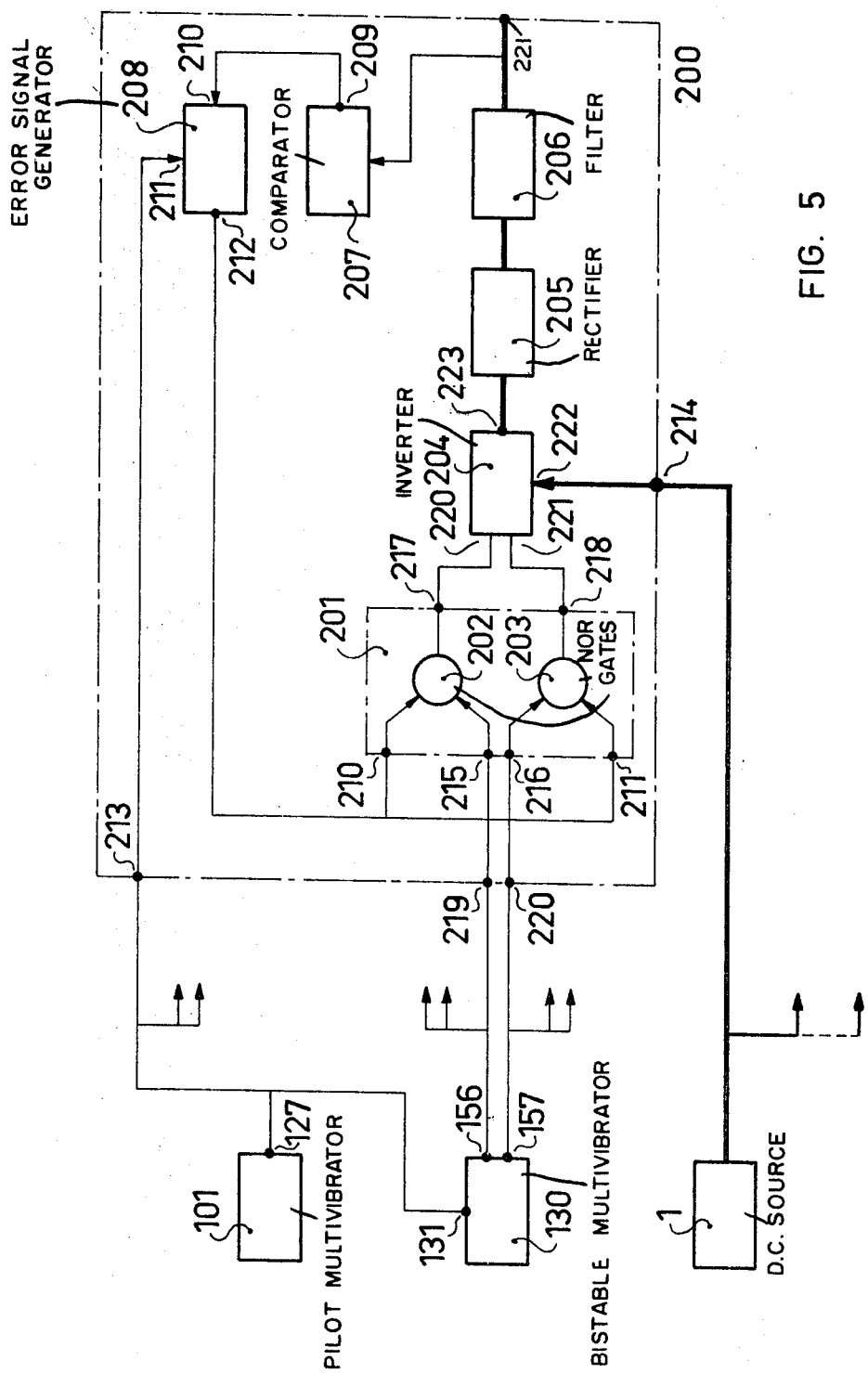
FIG. 5 shows the block diagram of a power supply system, according to a second preferred embodiment.

The power supply system comprises: a nonregulated DC power supply 1, an astable pilot multivibrator 101, a bistable multivibrator 130, common to all stabilizing units. In FIG. 5 only one of such stabilizing unit is schematically represented, and indicated on the whole by 200. It comprises: an enabling device 201, which in turn comprises two logical circuits 202 and 203; a controlled inverter 204, a rectifying device 205, a filtering device 206, a comparison device 207, an error signal generator 208.

Figure 8:
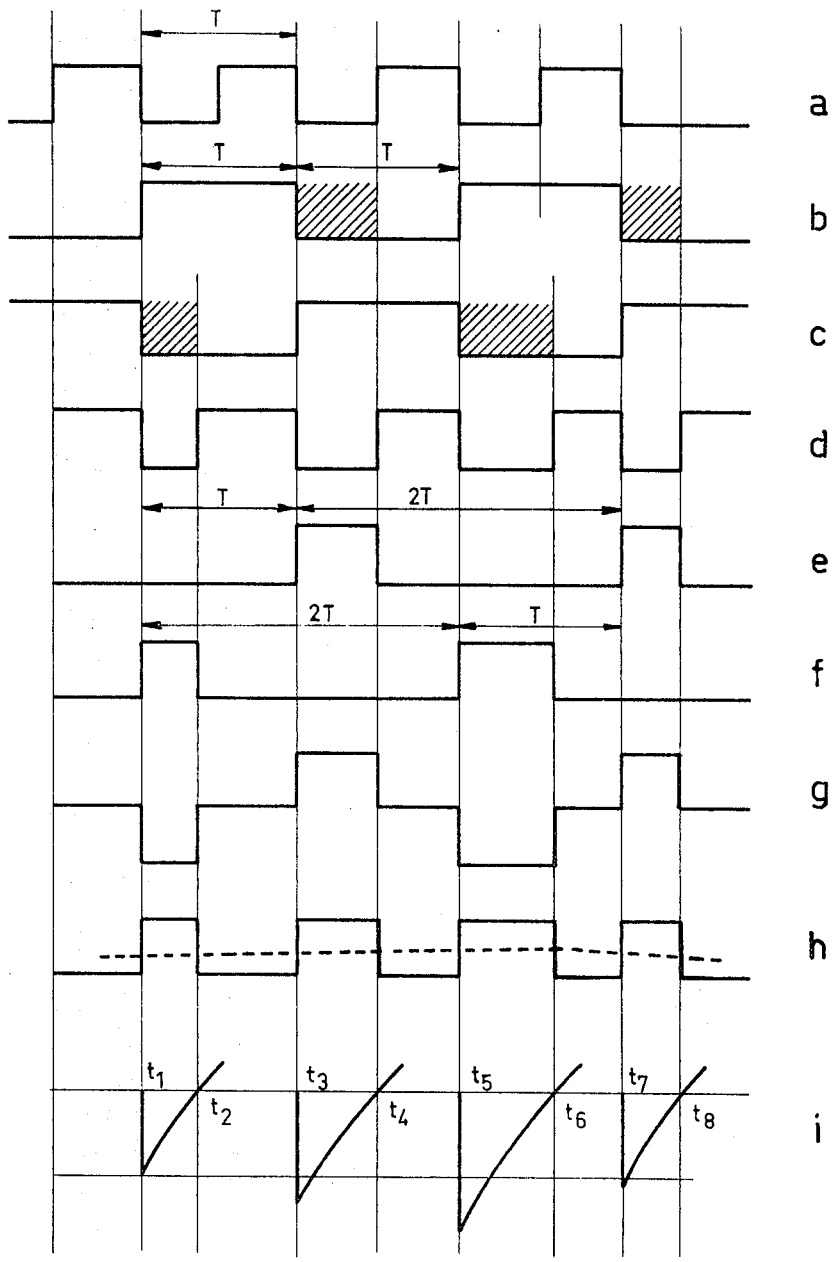
FIG. 8 shows the voltage and current waveforms in different points of the stabilizing unit of said second embodiment.

The pilot astable multivibrator 101 generates a signal formed by substantially rectangular voltage waves having a duration T/2, separated by time intervals of zero of voltage having a duration substantially the same (see diagram $a$ in FIG. 8). Said signal is applied to the input 131 of the bistable multivibrator 130 which delivers, to outputs 156 and 157 two different signals formed by substantially rectangular voltage waves having duration T, separated by intervals of zero voltage having a substantially equal duration (diagram $b$ and $c$ in FIG. 8). The intervals of presence of voltage on one output coincide with the intervals of zero voltage of the other output, and vice versa.

Said signals may be considered as a sequence of logical "level ONE" signals, corresponding to the presence of voltage, and "level ZERO" signals, corresponding to the absence of voltage. They are applied to the inputs 215 and 216 of the enabling device 201, to whose other inputs 210 and 211 a logical signal originated by the error signal generator 208 is conveniently applied. Such logical error signal is formed by a sequence of logical levels "ONE" and "ZERO," wherein each transition front from ONE to ZERO coincides substantially in time with a falling front of the signal generated by the astable pilot multivibrator 101, whereas each transition front from ZERO to ONE is separated from the preceding said transition front from ONE to ZERO by a time interval depending only on the difference between effective value and correct value of output voltage.

The enabling device 201 is substantially formed by two NOR gates; on each one of its outputs a logical signal ONE, corresponding to presence of voltage, will be present in these time intervals wherein, to both inputs of the corresponding NOR gate, two logical ZERO levels are present.

Therefore, at the outputs 217 and 218, square voltage waves will be present, having a variable duration coincident with the time interval corresponding to the duration of the logical ZERO level of the error signal, alternatively on output 217 and 218. As a consequence, the interval between subsequent rising fronts of said waves on the same output is equal to 2T, whereas the interval between the rising front of a wave on an output, and the subsequent rising front on the other output is equal to T (diagrams $e$ and $f$ of FIG. 8).

Said signals are applied to inputs 220 and 221 of the controlled inverter 204, to whose other input 222 the voltage delivered by the nonregulated DC power supply 1 is applied.

Said controlled inverter is substantially alike the controlled inverter 6 of FIG. 1. At the output 223 alternating voltage square waves of variable length are present. Said alternating voltage is rectified by the rectifying device 205 and filtered by the filtering device 206 as described before. The output of the filtering device delivers the stabilized current, which is available at the output 221 of the stabilizing unit.

Said output voltage is applied to the comparison device 207 wherein a comparison voltage, function of the output voltage, is compared to a reference voltage, that is, to the voltage across a Zener diode, in such a manner, as to obtain at output 209 a voltage which is function of the difference between said comparison voltage and said reference voltage.

Said output voltage is applied to input 210 of the error signal generator, which is substantially a monostable multivibrator, the signal generated by the pilot astable multivibrator 101 being applied to its other input 211. The monostable multivibrator 208 is piloted by the falling fronts of the signal generated by the pilot astable multivibrator 101, and generates voltage square waves, whose duration depends on the value of the voltage generated by the comparison device.

Figure 6:
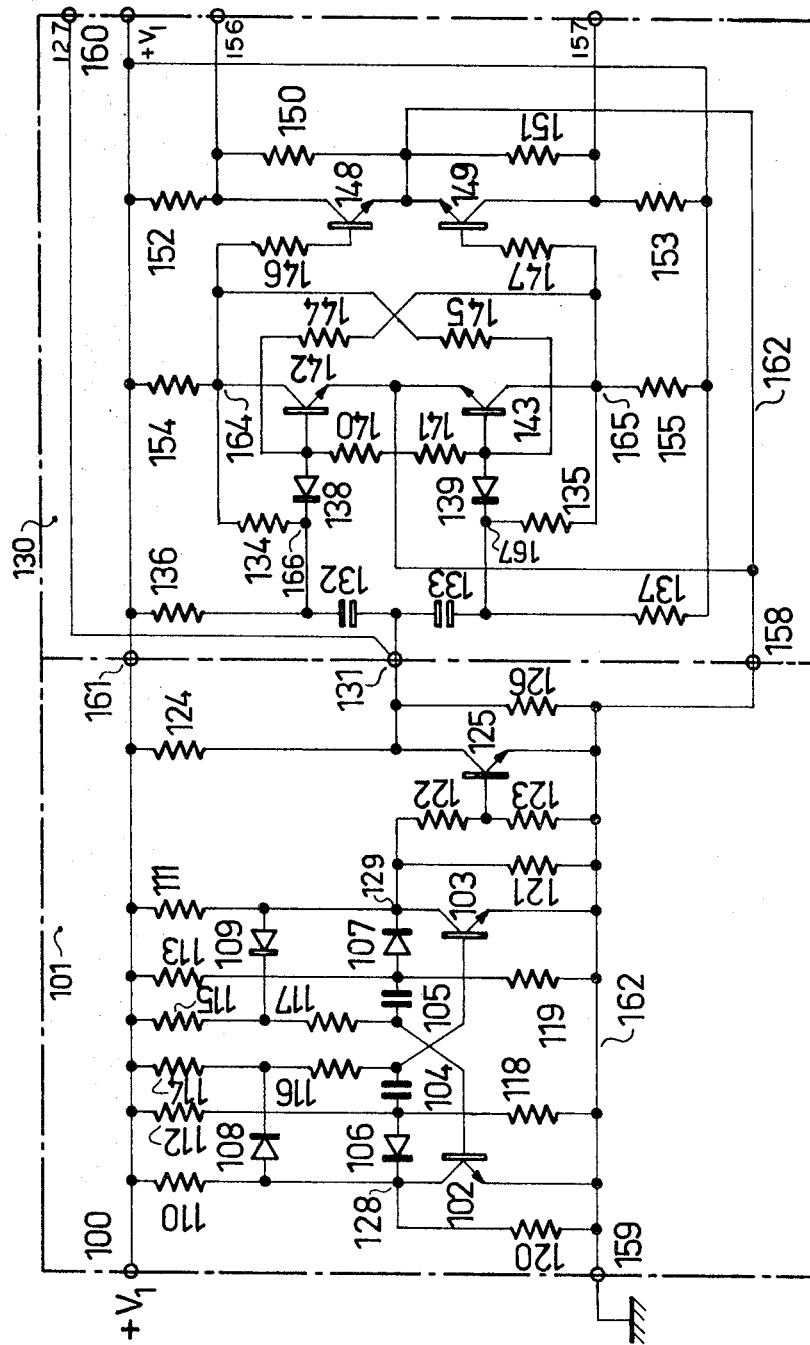
FIG. 6 represents the wiring diagram of the pilot multivibrator and of the monostable multivibrator used in said second embodiment.

FIG. 6 indicates the wiring diagram of the astable pilot multivibrator 101 and of the bistable multivibrator 130.

The astable multivibrator 101 comprises NPN-type transistors 102 and 103, whose collectors are fed by voltage $+V_1$ applied to terminal 100, through resistors 110, respect. 111, while the bases are fed through the series connected resistors 115 and 117 respect. 114 and 116. The emitters are connected directly to wire 162 which acts as reference wire and may be considered connected to ground by terminal 159.

The coupling condenser 104 respect. 105 are connected between bases of transistors 103 respect. 102 and the central point of the voltage dividers formed respectively by series connected resistors 112 and 118, respect. 113 and 119. Diode 106 and 107 are connected respectively between central points of said dividers, and collectors of transistors 102 respect. 103. Diodes 108 and 109 are connected between collectors of transistors 102, resp. 103 and the central point of the dividers formed respectively by series connected resistors 114 and 116, respect. 115 and 117.

Resistor 120 acts as output load of transistor 102, while the network comprising resistors 121, 122 and 123 loads transistor 103; the common point of resistors 122 and 123 is connected to the base of the output transistor 125, whose collector is fed through resistor 124 and is loaded by a resistor 126. The output signals are present at terminal 131 with respect to reference wire 158 which is connected to wire 162 and to earth.

The operation of the astable multivibrator 101 is as follows:

It is assumed that initially the transistor 103 is conducting and transistor 102 is cut off. The voltage of the base of transistor 102 is negative, but is rising towards the positive values because capacitor 105 is being discharged through resistors 115 and 117, series connected.

On the contrary, transistor 103 is conducting, and therefore point 129 is at a voltage near zero; diode 107 is directly biased. Point 128 is at a relatively high positive potential, and in consequence diode 106 is reversely biased. Capacitor 104 is charged, as it has an armature to the positive voltage determineated by the resistance values of voltage divider 112—118, and the other armature to voltage near zero of the base of transistor 103.

When the voltage of the base of transistor 102, as a consequence of the discharging of capacitor 105, reaches the conductivity threshold, transistor 102 starts to conduct, voltage of point 128 falls rapidly toward zero, diode 106 is directly biased and therefore becomes conductive, a negative voltage front is applied to base of transistor 103 which is abruptly cut off. As a consequence, the voltage of point 129 rises abruptly, diode 107 becomes inversely biased, and is cut off. In this condition the rise of voltage of point 129 is no more controlled by the capacity of capacitor 105. Said capacitor is charged through resistors 113 according to the time constant determined by the values of the resistances of resistors 113, 119 and the capacity of capacity 105.

In the same time interval capacitor 104 is discharged following the time constant determined by resistance values of resistors 114 and 116 and its own capacity value, and the voltage of transistor 103 rises towards the positive values. When said voltage has reached the conductibility threshold of transistor 103, said transistor becomes conductive, and the process is repeated.

As a consequence, at point 129 square wave signals are present, whose duration is determined by the values of the time constant related to resistors 115 and 117 and capacitor 105, said square waves being separated by time intervals of zero voltage having a substantially equal duration, as the components which compose the network referring to transistors 102 and 103 are alike and symmetrically connected.

When transistor 103 is conducting, point 129 is at a voltage near zero, and diode 109 is reversely biased. Therefore the base current of transistor 102 is limited by resistors 115 and 117, resistor 115 having a resistance value substantially higher than the one of resistor 111, and such as to prevent, in any case, the flowing of a base current sufficient to cause the saturation of transistor 102. In the other hand, when transistor 103 is cut off, diode 109 is directly biased, and a substantial portion of the base current of transistor 102 is delivered through resistor 111 and diode 109. The resistance value of resistor 111 is such as to allow transistor 102 to saturate. Therefore transistor 102 may reach the saturation only if transistor 103 is cut off. The same is reciprocally true: transistor 103 may saturate only if transistor 102 is cut off. This disposition ensures that transistors 102 and 103 cannot both be saturated at the same time. As a consequence, when the feeding voltage is applied to terminal 100, the oscillatory process is assuredly initiated, also in case the rising of said feeding voltage should be very slow: in effect, assuming that said voltage should reach the final value without the oscillatory process being initiated, transistors 102 and 103 will be both conducting, but none of them will be saturated because, the diodes 109 resp. 110 being reversely biased, the respective bases of said transistors are fed through the high resistance, series connected, resistors 115 and 117, resp. 114 and 116. Both transistors are in the operating condition called "active zone," wherein every small variation of the base current causes a substantially higher variation of the collector current. This is an unstable equilibrium condition; for instance an increase in the base current of transistor 103 causes an increase in its conductance. In consequence the collector current increases, and the voltage of point 129 decreases. Said diminution of voltage of point 129 is transferred through diode 107, directly biased, and capacitor 105, to base of transistor 102, causing its collector current to decrease. The voltage of point 128 increases, said increased voltage is transferred to base of transistor 103, causing a further increase of the base current. By such reciprocal action the equilibrium is lost, and the oscillating condition may initiate.

The signal present at point 129 is applied, through resistor 122, to base of output transistor 125, causing the same to be alternatively saturated and cut off. As a consequence, at terminals 127 and 131 a signal is obtained, which is formed by intervals of T/2 duration, during which the voltage is present, separated by intervals of the same duration, during which the voltage is absent, as shown in diagram *a* of FIG. 8.

Said square wave voltage signal is applied through terminal 131, to bistable multivibrator 130 comprising two oscillating transistors 142 and 143 and two output transistors 148 and 149. Transistor 142 is fed by voltage $+V_1$ through terminal 161 and collector resistor 154; its emitter is connected to reference wire 162 which, through terminal 158, is connected to terminal 159 which may be considered to ground potential. The base of transistor 142, through resistor 144 is connected to collector of transistor 143 at point 165. Said collector is, in turn, fed by voltage $+V_1$ through resistor 155, and its base, through resistor 145, is connected to the collector of transistor 142 at point 164. The emitter of transistor 143 is connected to ground wire 162. The bases of said transistors 142 and 143 are also connected through diodes 138 resp. 139, to an armature of capacitor 132 resp. 133, said capacitor having the other armature connected to input terminal 131. Point 166, connected to diode 138 and to capacitor 132, and respectively point 167, connected to diode 139 and to capacitor 133, are also connected to the feeding terminal 160 through resistors 136 resp. 137. Collectors of transistors 142 resp. 143 are connected, through resistors 146 resp. 147 to the bases of output transistors 148 resp. 149, which are fed through resistors 152 resp. 153, have their emitters connected to ground wire 162 and the collectors connected to output terminals 156 resp. 157.

The operation of bistable multivibrator 130 is as follows:

It is assumed that at a given instant transistor 142 is saturated. Point 164 is substantially at ground voltage, and such voltage applied through resistor 144 to base of transistor 143 holds the same in cutoff condition. Point 165 is then at a relatively high positive voltage, and said voltage, applied through resistor 145 to base of transistor 142 holds the same in saturated condition.

The signals incoming from astable multivibrator 101 are applied to input 131 and, through capacitors 132 and 133 their waveforms are applied, as positive and negative pulses, to diodes 138 and 139. Said diodes are connected in such a manner, as to transfer to bases of transistors 142 resp. 143 only the negative pulses. In the assumption that transistor 142 is saturated, point 164 is substantially at zero potential. As a consequence, point 166 is at a potential determined by resistance values of resistors 136 and 134, which are so chosen, that said potential is conveniently low. As, according to assumption transistor 143 is cut off, point 165 is at a relatively high positive potential, and, through resistor 135, also point 167 is at a relatively high potential. Therefore, when a negative pulse is transferred through condenser 132 and 133 to points 166 resp. 167, point 166, which is at a lower potential, becomes negative in a measure sufficient to directly bias diode 138, which becomes conductive. As a consequence, the base of transistor 142 becomes negative and transistor 142 is cut off. Point 164 then acquires a sufficiently high positive potential, and said potential is transferred through resistor 134 to point 166, which is brought to a relatively high positive potential.

As an effect of the connection through resistor 145, also the base of transistor 143 is brought to a relatively high voltage, and said transistor saturates. Point 165 is brought to a potential very near to zero, but point 167 follows this variation with a delay, due to the time constant of the circuit formed by resistor 135 and capacitor 133. Therefore, point 167, for a defined time interval, after saturation of transistor 143, remains to a potential sufficiently high to prevent that the negative pulse, transferred through capacitor 133, may reach through diode 139 the base of transistor 143.

By said delay, the condition enabling a negative pulse applied to input 131 to influence the base of transistor 143 is established only after a time interval sufficiently long to ensure that the negative pulse which has caused the change of condition of the multivibrator is certainly extinguished.

In the new condition transistor 143 is saturated, point 165 has a near zero voltage, and said voltage, applied through resistor 144 to the base of transistor 142 holds transistor 142 in cutoff condition. Point 164 is at a relatively high positive voltage, and said voltage, applied to the base of transistor 143 through the voltage divider formed by resistors 145, and 141, holds transistor 143 in saturated condition. The relatively high potential of point 164 applied to point 166 through resistor 134 prevents any subsequent negative pulse incoming from input 131 through capacitor 132 from being transferred through diode 138 to transistor 142, whereas the low voltage value of point 165, applied through resistor 135, to point 167 enables a subsequent pulse to be transferred through diode 139, in order to cut off transistor 143.

Therefore, at each negative pulse, that is, at every falling front of the voltage square wave generated by astable multivibrator 101, said bistable multivibrator changes its state. The frequency of such state changes is half the frequency of the signals generated by said astable multivibrator 101.

When transistor 142 is saturated, and point 164 is substantially at zero voltage, said voltage, transferred through resistor 146 to base of transistor 148, holds the same in the cutoff condition. As a consequence, output terminal 156, connected to collector of transistor 148, is at a relatively high potential, in a measure determined by the resistance values of resistors 152 and 150.

In said condition transistor 143 is cut off, and consequently point 165 is at high potential, and said potential transferred through resistor 147 to base of transistor 149 holds said transistor in saturated condition, and consequently output terminal 157 is at a substantially zero voltage. Both output terminals are therefore alternatively and subsequently brought to zero and to positive voltage, in such a way that, when one of them is at zero voltage, the other one is at positive voltage, and vice versa. The time interval during which each one of said output terminals is at positive potential is T, and the time intervals of zero potential are substantially of the same duration. (Diagram b and c of FIG. 8).

Figure 7:
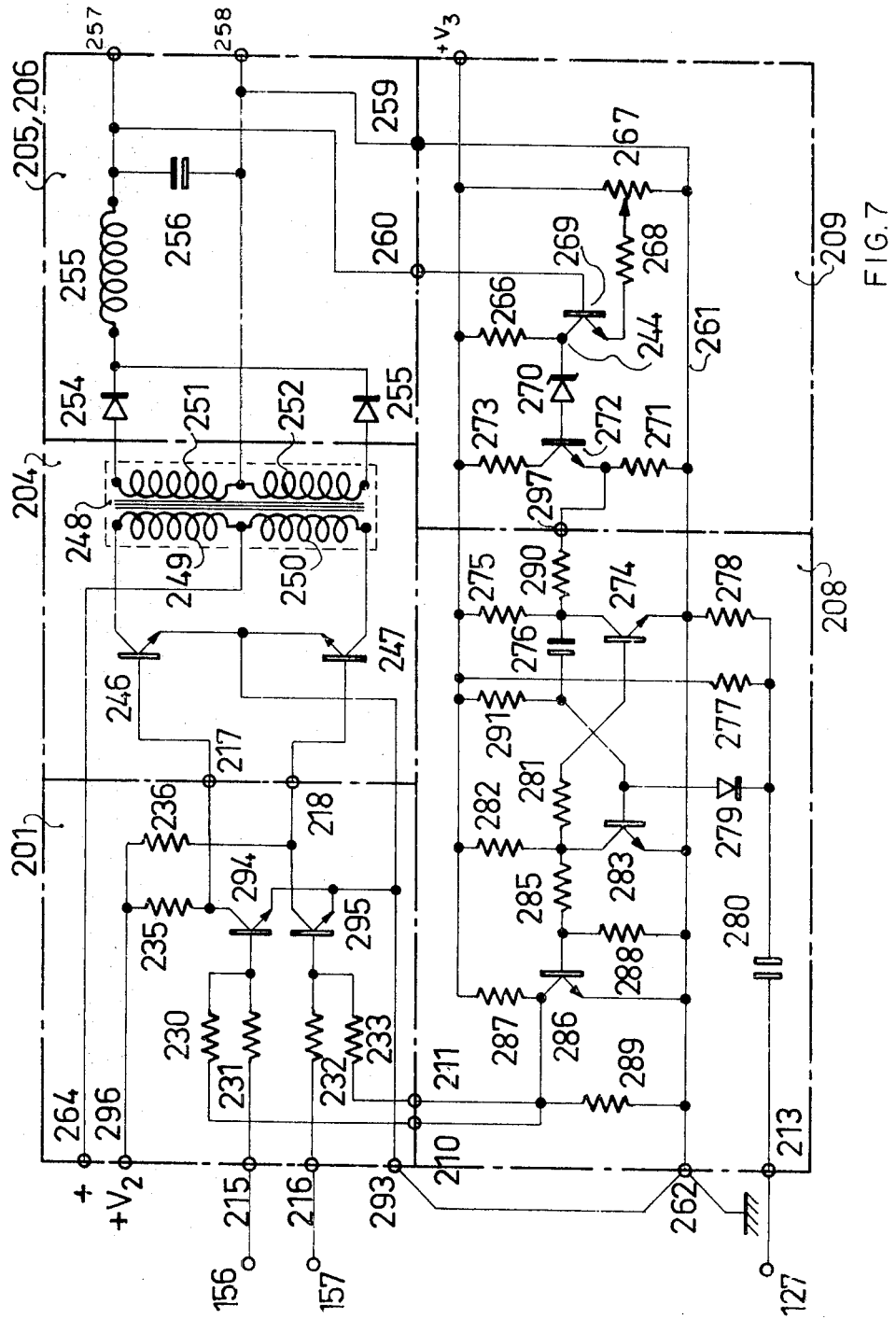
FIG. 7 shows the wiring diagram of a stabilizing unit according to said second embodiment.

The signal generated by the pilot astable multivibrator 101, available at terminal 127 is applied to terminal 213 of the stabilizing unit 200 taken in consideration, whose wiring diagram is represented in FIG. 7. The signals generated by the bistable multivibrator 130, available at terminals 156 and 157 of FIG. 5, are applied to terminals 215 and 216 of said stabilizing unit. A single pilot astable multivibrator and a single bistable multivibrator 130 may control a convenient multiplicity of stabilizing units.

The stabilizing unit represented in FIG. 7 comprises an enabling device which in turn comprises two NOR gates. One of said gates comprises resistors 230 and 231, cooperating with transistor 294, fed through resistor 235, to form a resistor-transistor NOR circuit, having two inputs 215 and 210; the other one comprises resistors 232 and 233 cooperating with transistor 295, fed through resistor 236, to form the second resistor-transistor NOR circuit, having two inputs 216 and 211. Said enabling device is fed by a positive voltage +$V_2$ applied to terminal 296, having a convenient value, which may be delivered either by the nonregulated power supply 1 after stabilization by means of a Zener diode, not shown, or by an auxiliary low power rectifying unit, also not shown.

The negative terminal of said auxiliary rectifying unit, if present, and the negative terminal of the nonregulated power supply 1 are both connected to terminal 293. The wire connected to said terminal acts as reference wire for all voltages in the circuit. It may be considered at ground voltage.

The positive terminal of the nonregulated power supply is in any case connected to terminal 264.

Terminals 217 and resp. 218 are the output terminals of both NOR gates comprising transistors 294 resp. 295. According to the well-known way of operation of said NOR gates, when transistor 294 is saturated, terminal 217 is at a low potential, that is, near to zero, and this takes place when a positive signal is applied at least to one of both inputs 210 and 215.

To cut off transistor 294, it is necessary therefore that both inputs 215 and 210 be potential near zero. In this condition point 217 is a relatively high positive potential.

In a similar way, terminal 218 is at potential near to zero, when transistor 295 is saturated: in order to bring it at a relatively high positive potential, it is necessary that no positive signal be present either to input 211 or to input 216.

Enabling device output terminals 217 and 218 are connected to bases of power transistors 246 and 247 having their emitters connected both to ground terminal 293 and to negative terminal of the nonregulated power supply 1. Their collectors are connected to terminal points of the sections 249 and 250 of primary winding of transformer 248: the central point common to both sections is connected to terminal 264 to which the positive terminal of the nonregulated power supply 1 is connected.

The secondary winding of transformer 248 comprises two sections 251 and 252 having a common point and whose two terminal points are connected to the anodes of two power rectifiers 254 and 255, whose cathodes are both connected to the input of inductor 255, which, with capacitor 256, forms the filtering device.

The stabilized current is available at terminals 257 and 258. The voltage existing between such terminals is brought to terminals 260 and 259 of the comparison device.

The comparison device described thereafter, in a way of example, is fed, together with the error signal generator, by voltage source +$V_3$. Said voltage is referred to the negative terminal of the output voltage, that is, to terminal 258 to which terminal 259 and reference wire 261 acting as ground wire are both connected. It is also connected to terminals 262 and 293, that is, to the ground wire of the enabling device.

The comparison device comprises a transistor 269 fed by voltage $V_3$ through resistor 266, to whose base the positive voltage existing at terminal 260 is applied. Emitter of transistor 269 is connected through resistor 268 to the movable contact of potentiometer 267, whose terminals are connected by one side to feeding voltage $V_3$ and by other side to ground. The point common to resistor 266 and collector of transistor 269 is connected to the cathode of a Zener diode 270, whose anode is connected to the base of transistor 272 fed by voltage source $V_3$ through resistor 273 and whose emitter is connected to earth through resistor 271.

In normal conditions both transistors 269 and 272 are operating in the "active zone," that is in conducting condition, far from saturation. In such condition a small variation of base current causes a substantially greater variation on the collector current. Therefore a small variation of the voltage difference between terminals 257 and 258 causes a variation of the base current of transistor 269 and in consequence a substantial variation of the collector current of same transistor. This causes a substantial variation of voltage of point 244, connected to cathode of the Zener diode 270. As the voltage drop across the Zener diode is substantially constant, said substantial voltage variation is transferred integrally to the base of transistor 272 causing a substantial variation of the base current of said transistor, and, consequently, a yet greater variation of the voltage of terminal 297, which is the input to the error signal generator.

The error signal generator is, substantially, a monostable multivibrator, able to generate positive voltage pulses having a duration variable under control of the signal incoming from the comparison device. It comprises a transistor 274 having the emitter connected to ground, the collector fed at +$V_3$ voltage through resistor 275, and connected to one armature of the capacitor 276 whose other armature is connected to the base of transistor 283.

Said transistor 283 is fed by voltage $V_3$ through resistor 282, its emitter is ground-connected, and its collector is connected through resistor 281 to base of transistor 274. Base of transistor 283 is also connected to anode of diode 279 whose cathode is connected to the central point of the divider formed by resistor 277 and 278, whose terminal points are connected, respectively, for feeding voltage +$V_3$ and to earth. In addition the cathode of diode 279 is connected to one armature of condenser 280 whose other armature is connected to terminal 213, to which are applied the square wave signals incoming from the pilot astable multivibrator 101 through terminal 127.

Collector of transistor 283 is connected also, through the divider formed by resistors 285 and 288, to base of transistor 286 fed by voltage $V_3$ through resistor 287 and having the emitter connected to ground.

The collector of said transistor is connected to both terminals 210 and 211 which are the inputs to the enabling device, and moreover to ground through resistor 289.

In rest condition, transistor 283 is saturated, and its collector is at a voltage near zero. Such voltage, transferred through resistance 281 to base of transistor 274 holds the same in cutoff condition: therefore the collector of transistor 274 is at a relatively high positive voltage.

The voltage of collector of transistor 274 is dependent also upon the voltage of the emitter of transistor 272 which is part of the comparison device, and is connected to terminal 297. In rest condition, transistor 286 is cutoff and therefore output terminals 210 and 211 are at a relatively high positive potential.

If a falling wave front is applied to a capacitor 280, a negative pulse is transferred through diode 279 to base of transistor 283, cutting it off. The collector of said transistor acquires an high positive voltage, and said voltage, transferred through resistor 281 saturates transistor 274. Collector of transistor 274 goes to zero voltage, the resulting negative pulse is transferred to base of transistor 283, holding the same in cutoff condition also after the negative pulse applied through capacitor 280 is extinguished.

Subsequently, capacitor 276 is discharged through resistor 291, according to a time constant determinated by the resistance of said resistor 291 and the capacity of capacitor 276, and consequently the base voltage of transistor 283 rises towards positive values.

When the base of transistor 283 has reached the conduction threshold, said transistor saturates, its collector goes to zero voltage, and through resistor 281, cuts off transistor 274, and the circuit returns in rest condition.

Depending upon the initial voltage of the collector of transistor 274, that is, depending upon the voltage of the emitter of transistor 272, the negative pulse transferred through capacitor 276 to base of transistor 283 is of greater or lesser amplitude, and therefore said base is brought to a greater or lesser negative voltage. As a consequence, the time needed for said base to reach the conductibility threshold is greater or lesser.

Diagram $i$ of FIG. 8 represents the law of variation of the base voltage of transistor 283, by different values of the voltage applied to collector of transistor 274 by the emitter of transistor 272 through terminal 297 and resistor 290. If said voltage, as in correspondence of instants $t_3$ and $t_5$, is greater than the one existing in correspondence to instant $t_1$, and $t_7$ the negative voltage reached by said base is also greater, and the time intervals $t_3$—$t_4$ and $t_5$ $t_6$, needed to reach the threshold conduction value are consequently greater than the time intervals $t_1$—$t_2$ and $t_7$—$t_8$. It follows that also the duration of the voltage square wave generated at the output by transistor 283 and represented by diagram $h$ of FIG. 8 is greater or lesser depending upon the voltage applied by emitter of transistor 272 to collector of transistor 274.

Therefore, as shown, in correspondence of every falling wave front present at terminal 213, that is, of every negative pulse transferred through capacitor 280, a positive voltage square wave is generated by collector of transistor 283, its rising front coinciding with the falling wave front of the voltage signals generated by astable multivibrator 101, its duration being dependent upon the voltage of emitter of transistor 272, that is, with the comparison device output. Said voltage signals are alike the ones represented by diagram $h$ of FIG. 8.

When transistor 283 is cut off, its collector is at a relatively high positive voltage, as said voltage, applied to base of transistor 286 through resistor 285, causes transistor 286 to saturate. As a consequence, the collector of said transistor goes to zero voltage. Therefore the voltage square waves of variable duration generated to the collector of transistor 283, are transferred in inverted way to the output of transistor 286, that is, to the terminals 210 and 211, which are the input terminals to the enabling device. Said inverted square waves have therefore their falling front substantially coincident with the falling fronts of the voltage signals generated by the pilot astable multivibrator 101, said falling fronts being followed by intervals of no voltage whose duration is variable and depends on the amplitude of the comparison device output signal. Said inverted square waves are represented by diagram $d$ of FIG. 8.

The operation of the stabilizing unit on the whole is the following:

The square wave voltage signal of period T, generated by the astable multivibrator 101 and represented by diagram $a$ of FIG. 8 is applied to terminal 213 of the error signal generator, and cause the emission of a synchronized signal comprising intervals of absence of voltage of variable duration applied to terminals 210 and 211 (diagram $d$).

The square wave voltage signal, generated at the output 156 of bistable multivibrator 130, having period 2T, is applied to terminal 215 (diagram $b$ of FIG. 8).

The square wave voltage signal, generated at the output 157 of the bistable multivibrator 130, having period 2T, is applied to terminal 216 (diagram $c$ of FIG. 8).

Output terminal 217 of the enabling device will be at a relatively high positive potential only during time intervals wherein zero voltage is present to both inputs 215 and 210, that is, during the intervals indicated by the hatchings in diagram $b$, corresponding to the intervals of coincidence of zero voltage both on diagram $d$ and diagram $d$. It follows that said terminal 217 will give out a signal formed by positive voltage square waves of variable length, whose rising fronts are separated by a time interval 2T (diagram $e$).

In the same way terminal 218 of the enabling device will be at relatively high positive voltage only during the intervals wherein both terminal 216 and 217 are at zero voltage, that is, during the intervals indicated by the hatchings of diagram $c$ of FIG. 8 corresponding to coincidence of zero voltage diagrams $c$ and $d$. Therefore said terminal 218 will give out a signal formed by positive voltage square waves of variable length, whose rising fronts are separated by a time interval 2T (diagram $f$).

During time intervals in which terminal 217 is at a relatively high positive potential, the power transistor 246 conducts, and a current delivered by the nonregulated power supply 1 flows through section 249 of primary winding of transformer 248. The duration and the form of said current wave substantially coincides with the duration and the form of the positive voltage wave present at terminal 217 (diagram $e$).

During the time intervals in which terminal 218 is at a relatively high positive potential the power transistor 247 is conducting, and a current delivered by the nonregulated power supply flows through section 250 of the primary winding of transformer 248, coincident in form and duration with the positive voltage wave present at terminal 218 (diagram $f$).

Said wave currents, which alternatively flows through two sections 249 and 250 of the primary winding of transformer 248, induce an alternating flux in the core of the transformer which in turn causes an alternating voltage across secondary windings 251 and 252. Said alternating voltage is formed by square waves of variable length, as shown by diagram $g$. By means of the rectifying device comprising power diodes 254 and 255, there is at the input of the filtering device, a rectified voltage wave as indicated by diagram $h$ of FIG. 8, formed by unidirectional square wave of variable length, separated by intervals of zero voltage.

The dashed line of diagram $h$ represents the average value of said voltage wave over a time interval T and coincides substantially with the value of the voltage of the stabilized current which is available to output terminals 257 and 259.

Said voltage is applied, as said, to input terminals of comparison device, 260 and 259. The positive voltage is applied through terminal 260, to the base of transistor 269. By adjusting potentiometer 268, and by the opportune choice of the auxiliary feeding voltage $V_3$, it is obtained that transistor 269 is conducting in the active zone. If the stabilized output voltage increases, transistor 269 becomes more conductive, its collector current increases, and the voltage of point 244 decreases. Such voltage variation is transferred without change to base of transistor 272, and therefore transistor 272 becomes less conductive. It follows that the emitter current decreases, and the voltage of terminal 297 is substantially diminished. Said voltage diminution, applied through resistor 290 to collector of transistor 274, cause a decrease in the amplitude of the negative front transferred through condenser 276 of the base of transistor 283, at the instant wherein the multivibrator goes over from the stable to unstable condition. It follows that the time of permanence of the multivibrator in said unstable condition decreases. The duration of said time of permanence in the unstable condition coincides with the duration of the time intervals during which terminals 210 and 211 are at zero voltage, and with the duration of the unidirectional square waves present at the output of the rectifying device (diagram h). Said duration is, in consequence, diminished, and therefore its average value over the interval T is diminished; and so the voltage of the stabilized current. There is, as shown, a feedback effect which is opposed to the variation of the output voltage in such a way, that the same is always brought back to the correct value.

Said correct value may be regulated, within certain limits, changing the position of the variable contact of potentiometer 267.

We claim:

1. Apparatus for regulating the voltage of power provided by an unregulated direct current power source comprising: a generator of a pair of constant frequency square wave signals in phase opposition; an inverter comprising a pair of controllable conduction devices, each of said devices having a control electrode and a pair of controlled electrodes, a controlled electrode of each of said devices being coupled to said generator to receive a respective one of said square wave signals, whereby said devices are enabled to be conductive alternately; power conversion means connected to said power source and controlled by said devices for controlling current supplied by said source to flow in alternating directions relative to a reference point in correspondence with the alternate conduction of said devices; means for rectifying and filtering said alternating current to provide a steady output voltage; a comparison means coupled to receive said output voltage for producing an error signal having a value representing the deviation of said output voltage from a predetermined reference voltage; means coupled to said generator for providing control signals at twice the frequency of said square-wave signals; a trigger signal generator actuated by said control signals and responsive to said error signal for generating trigger pulses delayed from the time of occurrence of said control signals, the interval between the time of occurrence of each control signal and the following trigger pulse varying in accordance with the value of said error signal; and means for applying said trigger pulses to the control electrodes of said devices for initiating conduction in said devices.

2. The apparatus of claim 1, wherein said controllable conduction devices comprise silicon controlled rectifiers.

3. The apparatus of claim 1 wherein said trigger signal generator is a relaxation oscillator, each of said control signals resetting said oscillator, said oscillator having a frequency dependent on the value of said error signal.

4. The apparatus of claim 3 wherein the said relaxation oscillator comprises a unijunction transistor, said transistor being rendered nonconductive at the time of occurrence of each of aid control signals and being rendered conductive when an increasing voltage applied thereto reaches a threshold value.

5. The apparatus of claim 3 wherein said control signals comprise pulses separated by steady voltage levels, and wherein said pulses reset said oscillator and said steady voltage levels supply power for operating said relaxation oscillator.